UNITED STATES PATENT OFFICE.

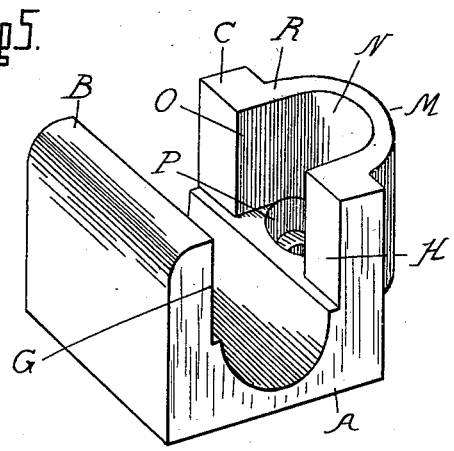
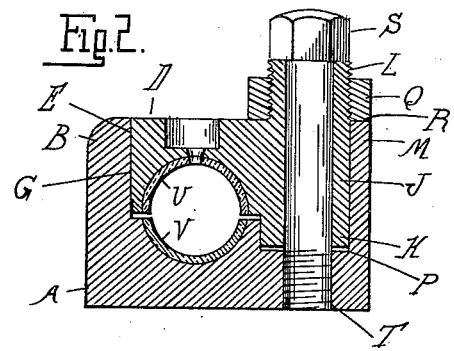
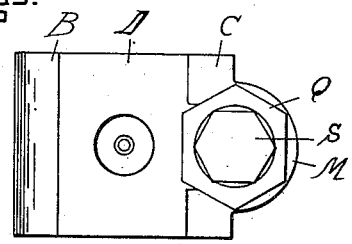
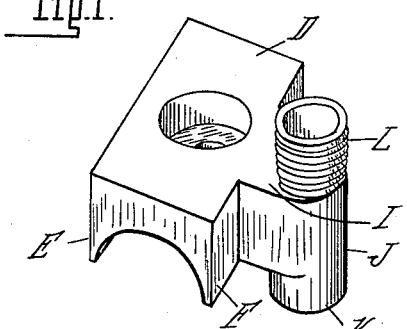
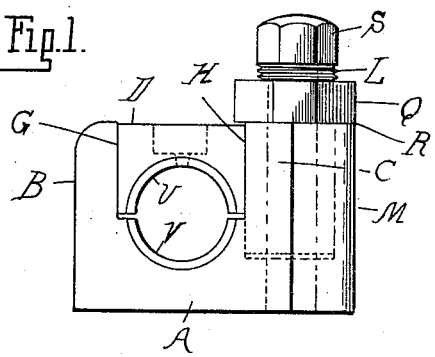

ARTHUR W. NELSON, OF CHICAGO, ILLINOIS.

JOURNAL-BOX.

1,005,455.  Specification of Letters Patent.  Patented Oct. 10, 1911.

Application filed April 11, 1910. Serial No. 554,695.

*To all whom it may concern:*

Be it known that I, ARTHUR W. NELSON, a citizen of the United States of America, residing at Chicago, in the county of Cook and State of Illinois, have invented certain new and useful Improvements in Journal-Boxes, of which the following is a specification, reference being had therein to the accompanying drawings.

My invention relates to journal boxes, and to that class in which the cap is adjustable in relation to the body of the box.

The invention has for its object to provide means whereby the cap may be easily and quickly adjusted, and to maintain the portion of the bearing proper carried by the cap in accurate alinement with the coöperating portion of the bearing carried by the body of the box.

To this end, the invention consists in the particular construction, arrangement and combination of parts, as more fully hereinafter described and pointed out in the claims.

In the drawings—Figure 1 is an end view of my improved construction of journal box; Fig. 2 is a cross section therethrough; Fig. 3 is a top plan view; Fig. 4 is a perspective view of the cap; and Fig. 5 is a similar view of the box body.

A represents the body of the journal box provided with vertically-extending portions B C, and D is the cap having flat bearing surfaces E F upon opposite sides thereof, which are adapted to engage similar bearing surfaces G H upon the vertical portions of the body. A lug I extends laterally from one side of the cap, and J is a hollow tubular member carried by said lug and having a portion K projecting below the plane of the bottom of the cap and a screw-threaded portion L extending above the cap top.

The body of the box is provided with an enlargement M having a bore N of a size to receive the member J, and the vertical extension C is cut away or recessed at O to permit of the passage therethrough of the lug I. In order to permit of adjusting the cap inward, the bore N is made of a length slightly greater than the length of that portion of the tubular member J between the threaded extension L and the lower end of the tubular member, while the recessed portion O is but slightly longer than the width of the lug I, thereby forming an annular bearing P for engaging the extension K of the member J. The inward movement of the cap in relation to the box body is limited by means of a nut Q adjustably engaging the threaded extension L and adapted to seat upon the upper face R of the enlargement M.

S is a bolt for clamping the cap in its adjusted position, and, as shown in Fig. 2, extends through the hollow member J and has a screw-threaded engagement at its lower end with a threaded aperture T.

To adjust the cap in relation to the box, the bolt S is loosened, the nut adjusted to raise or lower the cap as desired, and the bolt S is then tightened to lock the cap in its adjusted position. The comparatively wide flat surfaces E G F H maintain the coöperating portions U V of the bearing proper in accurate alinement for all positions of adjustment, and also prevent binding between the cap and the body of the box during adjustment.

My improved construction of journal box not only permits of quickly and accurately adjusting the cap, but also, since the coöperating portions of the bearing proper are maintained in accurate alinement for all positions of adjustment, the life of the journal box is greatly increased.

What I claim as my invention is:

1. A journal box comprising a body provided with spaced vertical projections, one of said projections being recessed, a cap fitting between said projections and having a lateral projection positioned in said recess, a hollow tubular member carried by said lateral projection having a screw-threaded portion extending above the plane of the top of the cap, an adjusting nut engaging the screw-threaded projection, and a bolt passing through said tubular member and having a screw-threaded engagement with the body.

2. A journal box, comprising a body provided with spaced vertical projections, one of said projections being recessed and provided with an enlargement having a bore communicating with the recess, a cap fitting between said projections and having a lateral projection positioned in said recess, a hollow tubular member carried by said lateral projection having portions projecting above and below the projections, the upwardly extending portion of said tubular member being screw threaded, an adjusting nut engaging the screw threaded portion, and a screw passing through said tubular member and having a screw threaded engagement with the body.

In testimony whereof I affix my signature in presence of two witnesses.

ARTHUR W. NELSON.

Witnesses:
DAVID W. KNOWLTON,
H. T. DOWNS.

Copies of this patent may be obtained for five cents each, by addressing the "Commissioner of Patents, Washington, D. C."